United States Patent
Birkel et al.

(10) Patent No.: US 6,416,606 B1
(45) Date of Patent: Jul. 9, 2002

(54) CONTINUOUS MANUFACTURING PROCESS FOR SECTIONS OR PLATES

(75) Inventors: Thierry Birkel, Vandoeuvre les Nancy; Jacques Van De Ven, Villars; Patrice Regennass, Ecromagny; Dominique Duchanois; Hassan Rachidia, both of Luxeuil les Bains; Nelly Pien, Danjoutin, all of (FR)

(73) Assignee: ITW Litec France, Tournus (FR)

( * ) Notice: Subject to any disclaimer, the term of this patent is extended or adjusted under 35 U.S.C. 154(b) by 0 days.

(21) Appl. No.: 09/294,436

(22) Filed: Apr. 20, 1999

(30) Foreign Application Priority Data

Apr. 21, 1998 (FR) .............................................. 98 04970

(51) Int. Cl.[7] ........................ B29C 47/00; B32B 31/30; B32B 31/20; C09J 103/00
(52) U.S. Cl. .................. 156/201; 156/202; 156/244.11; 156/244.12; 156/244.18; 156/252; 156/336
(58) Field of Search ....................... 156/244.12, 244.24, 156/244.27, 252, 336, 199, 200, 201, 202, 204, 244.11, 244.18, 244.25; 264/171.25, 211

(56) References Cited

U.S. PATENT DOCUMENTS

| 3,137,592 A | * | 6/1964 | Protzman et al. ........... 264/211 |
| 4,210,618 A |   | 7/1980 | Piltz et al. |
| 5,279,658 A | * | 1/1994 | Aung ....................... 106/154.1 |
| 5,317,037 A | * | 5/1994 | Golden et al. ............... 523/128 |
| 5,360,586 A |   | 11/1994 | Wyatt et al. |
| 5,618,341 A | * | 4/1997 | Anderson et al. ....... 106/285.35 |
| 5,665,152 A | * | 9/1997 | Bassi et al. ............... 106/145.1 |
| 5,720,913 A |   | 2/1998 | Andersen et al. |
| 5,736,209 A | * | 4/1998 | Anderson et al. ........... 428/36.4 |
| 5,789,031 A | * | 8/1998 | Hirabayashi et al. ........ 427/341 |
| 6,143,113 A | * | 11/2000 | Berube ........................ 156/210 |

FOREIGN PATENT DOCUMENTS

| EP | 0615838 | 9/1994 |
| FR | 2528350 | 12/1983 |
| FR | 2647129 | 11/1990 |
| WO | WO97/23333 | 7/1997 |

* cited by examiner

*Primary Examiner*—Michael W. Ball
*Assistant Examiner*—Barbara J. Musser
(74) *Attorney, Agent, or Firm*—Lowe Hauptman Gilman & Berner, LLP

(57) ABSTRACT

This invention concerns a continuous manufacturing process of sections (11) or plates from soft matter (2) which is extruded under heat and encased by at least one strip sheet (3, 3'), said encased matter subsequently being calendered, shaped to the desired profile and finally cut into lengths, process which is particularly remarkable in that the matter used is a mixture containing a non-synthetic binder and water, so that the mixture becomes sticky by undergoing said heat treatment in an aqueous medium, which assures adhesion of the casing onto the matter during calendering, while the product undergoes at least one drying operation after said calendering operation. The binder is advantageously starch-based and the mixture may also contain a plasticizer, for example containing urea. The invention also concerns an installation for implementation of the process and the products thus obtained.

40 Claims, 4 Drawing Sheets

CONTINUOUS MANUFACTURING PROCESS FOR SECTIONS OR PLATES

Figure 1:
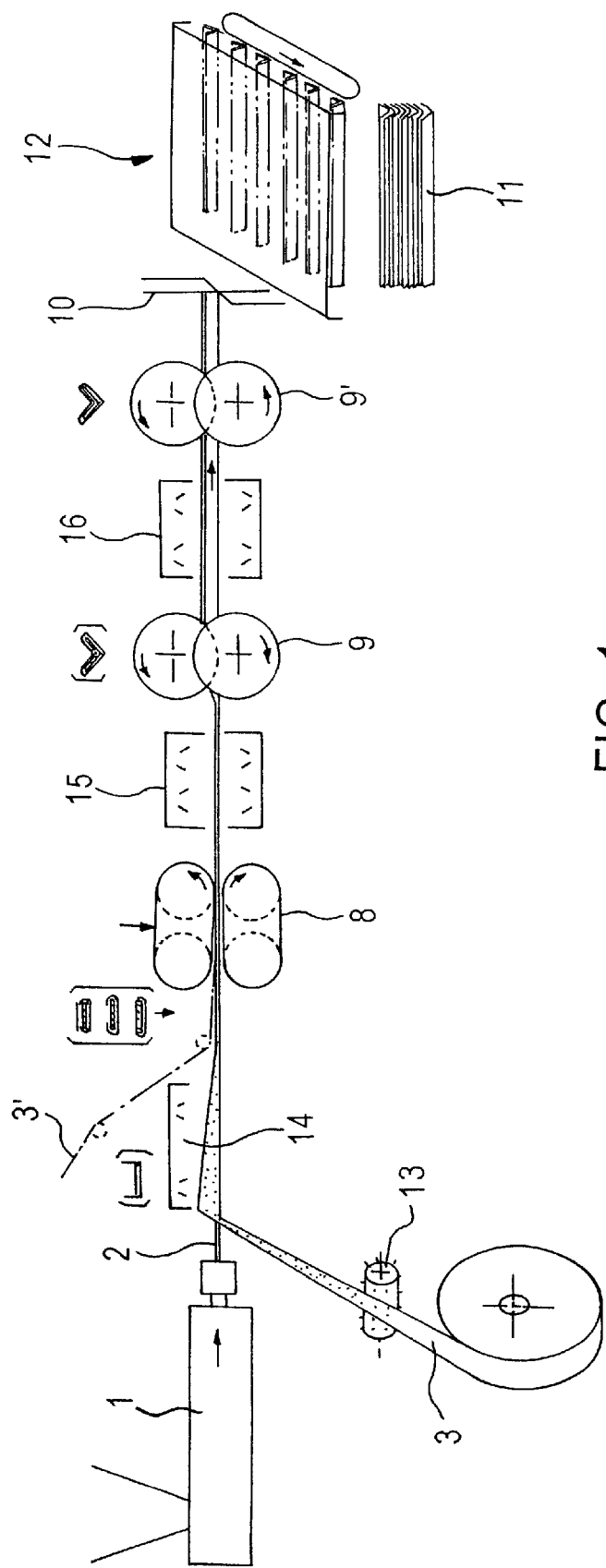

This invention relates to a continuous manufacturing process for sections or plates, and more particularly for corner bars. The invention also concerns and installation to implement the process and, needless to say, the products manufactured using said process.

For the manufacture of corner bars, strips of paper or cardboard are known to be glued together and covered with a casing that is preferably impermeable.

Also, paper-polythene complexes are known to be glued together under a flame and subsequently encased or not.

Products entirely in plastic material also exist. However, French patent 2 528 350 filed by the same holder, suggests in interesting manner that sections and plates can be made from a soft material which is extruded under heat and encased in at least one strip sheet, which unit is subsequently calendered, shaped to the desired profile and finally cut into lengths.

The material used is a thermoplastic material which may or may not contain other materials, and the process described in the above-mentioned patent is chiefly innovative compared with some other processes using thermoplastic, in that it avoids plastic flow or the thermoplastic material by fully encasing the material with one or two strip sheets taking care that the edges are properly covered.

The invention sets forth a process of interest, of which one objective is to manufacture a product that if recyclable by the paper industry and/or biodegradable.

For this purpose, the invention describes a process of the above-mentioned type, that is to say a manufacturing process using a soft material which is extruded under heat, encased in at least one strip sheet, and subsequently calendered, shaped to the desired profile and finally cut into lengths, but it is remarkable in that the matter used is a mixture containing a non-synthetic binder and water so that the mixture becomes sticky by undergoing said heat treatment in an aqueous medium, which ensures that the casing adheres to the matter during calendering while the product undergoes at least one drying operation after said calendering operation.

Not only does the invention give the benefit of all the advantages of biodegradable materials, but the choice of materials also assures simple, effective adhesion of the casing.

In fully advantageous manner, the non-synthetic binder contains starch which becomes sticky after gelling and fusion due to the heat treatment in an aqueous medium.

Generally, the starch-containing binder is derived from flour of non-foodstuff quality whose dry mass proportion in the mixture exiting the extruder is between 4 and 30%.

Preferably, the sheet or sheets intended to form the casing are chiefly made up of resistant paper or cardboard, and they may evidently be made up of a complex.

To assure good adhesion, the water content of the mixture exiting the extruder is, for example, between 4.5% and 15%.

According to one embodiment, the mixture comprises a plasticizer, contained for example in the mixture in a dry mass proportion of between 5% and 15%, said plasticizer containing a fatty acid or urea.

With a starch-based binder, the temperature of the material in the extruder is maintained between the melting point of starch, which depends upon its water content, and the degradation temperature of urea, this temperature being for example maintained for at least a certain time within a range of between 130° C. and 150° C. The temperature is adjusted in relation to the chosen water content.

Advantageously, the mixture also comprises biodegradable loads, the latter being for example contained in the mixture in a dry mass proportion of 40% to 85% and comprising mainly paper for example up to ⅘.

According to one embodiment, the product undergoes drying during processing, using for example infra-red and/or micro-wave and/or high frequency However, and in addition, specific drying can be provided at the end of manufacture on each length of section or plate, which are passed in front of means blowing hot air.

According to one embodiment, at least one of the sheets intended to form the casing is permeable in order to facilitate drying of the finished or semi-finished product, said sheet being, for example, made permeable by perforation in numerous plates before depositing the matter.

The sheet or sheets intended to form the casing, may only partially surround the matter in order to facilitate drying of the finished or semi-finished product.

The invention also concerns an installation for implementing the process, said installation comprising extrusion means for soft matter, means for encasing the latter at least in part, and means for its calendering, forming and cutting into lengths, while it is remarkable in that it also comprises drying means placed between at least some of said processing means.

Said installation may also comprise a drying unit positioned after the length cutting means, said unti comprising means of blowing hot air and means of transporting section lengths. The installation may also comprise perforating means to perforate at least one of the sheets intended to form the casing according to one embodiment of the process of the invention as mentioned above.

Finally, the invention evidently relates to any section or plate formed from the soft matter encased by at least one sheet which is manufactured according to the above-mentioned process.

Figure 2:
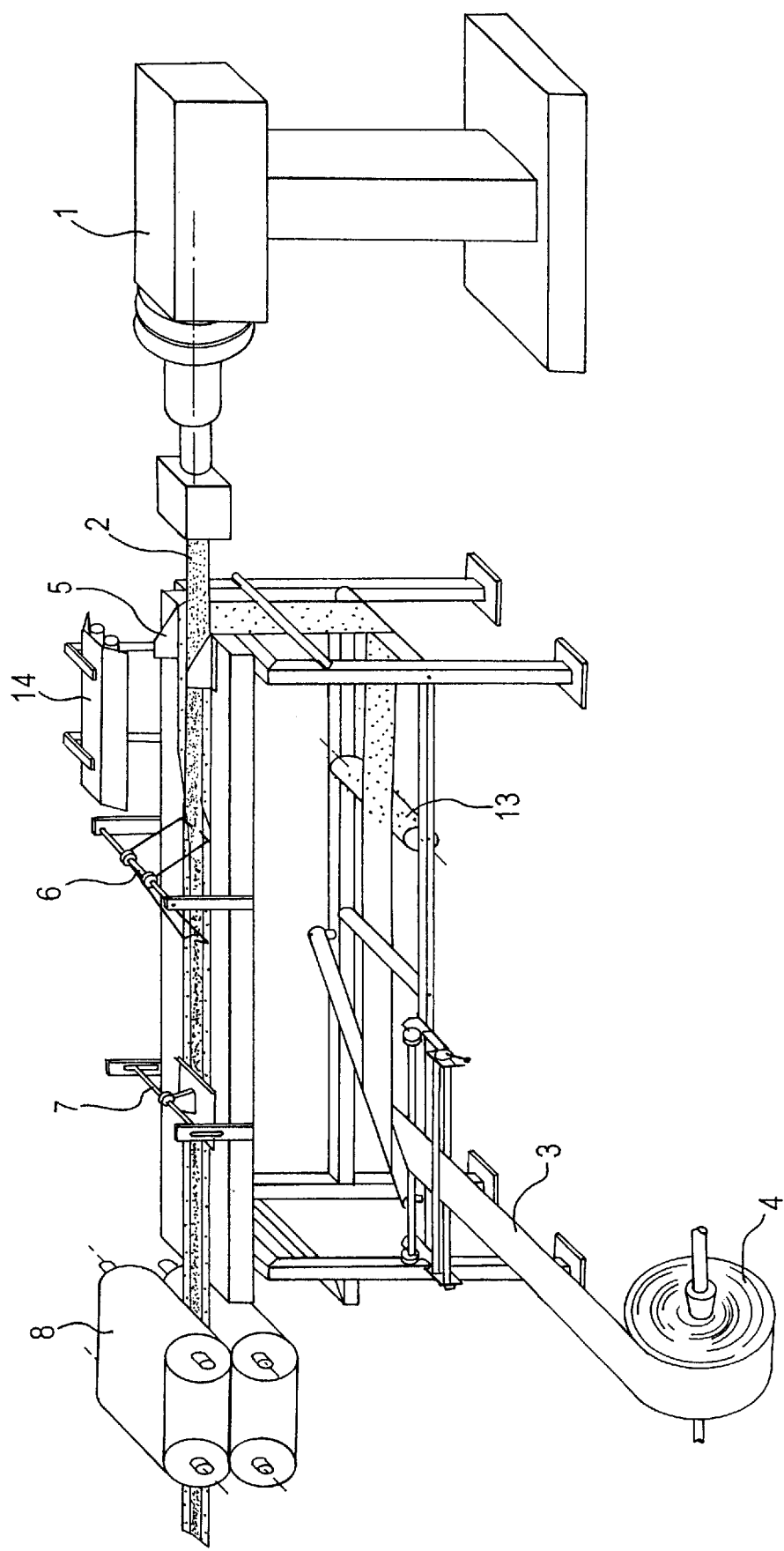
Figure 3:
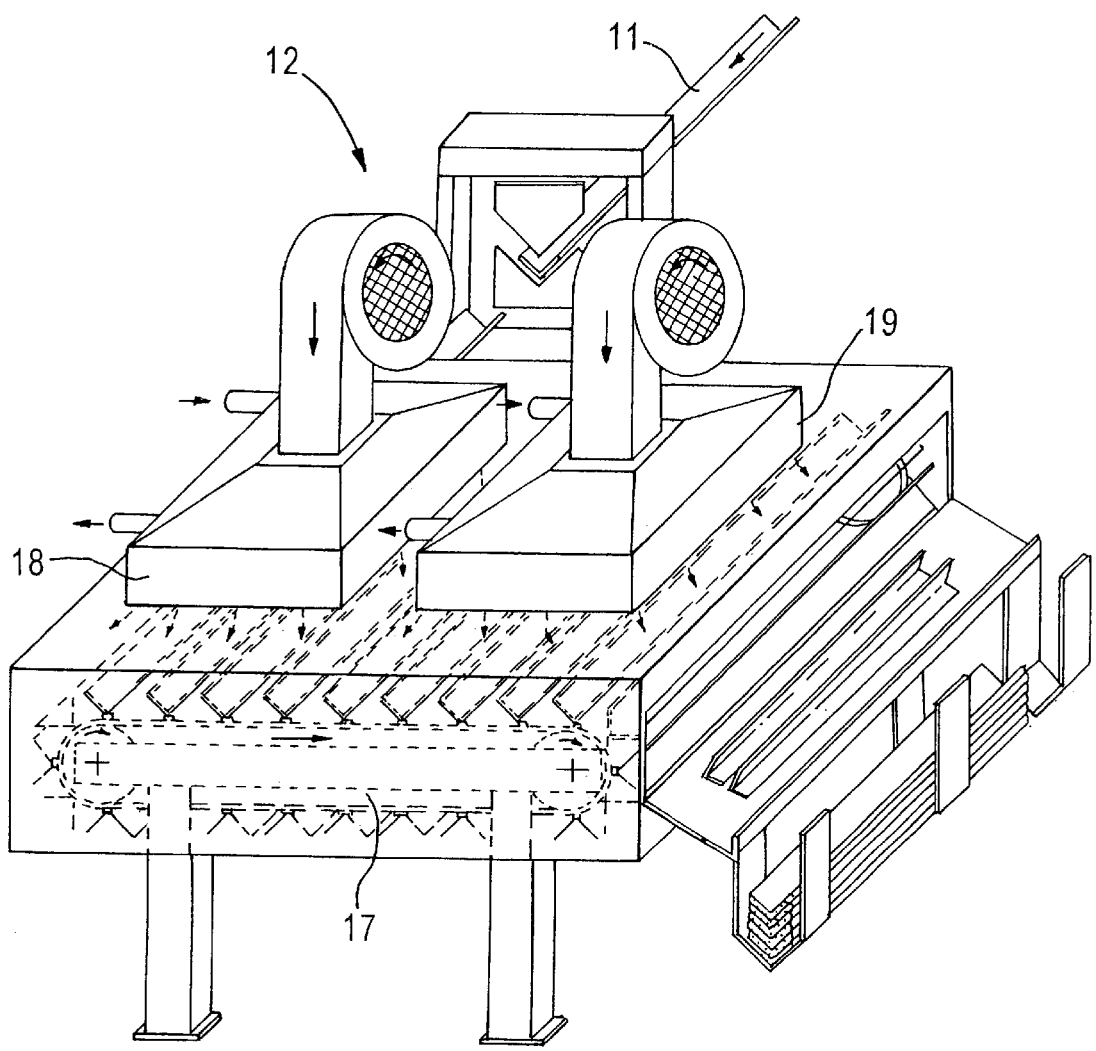
Figure 7:
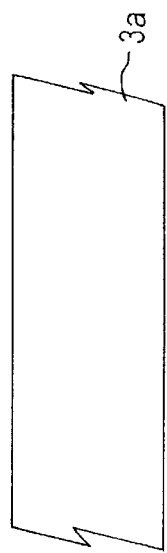
Figure 8:
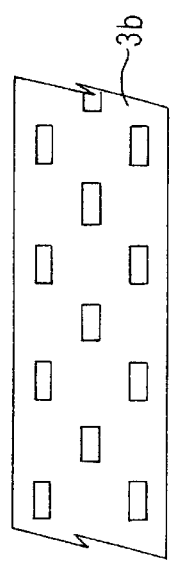
Figure 9:
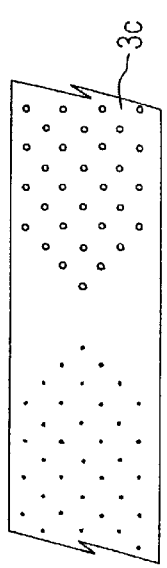
Figure 10:
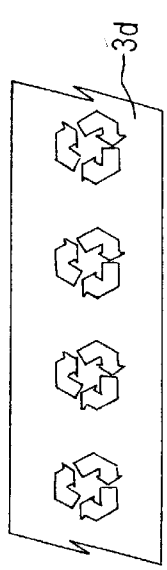

The invention will be well understood on reading the following description which refers to the appended drawings in which:

FIG. 1 is an illustration giving a vertical section view or the manufacturing installation, FIG. 2 is a perspective view of the installation in FIG. 1, FIG. 3 gives a detailed view of the drying unit illustrated in FIG. 1, FIGS. 4, 5 and 6 give a cross section view of the possible corner bars manufactured according to the invention, FIGS. 7, 8, 9 and 10 illustrate cross-sections of sheets intended to form the casing of the product according to several embodiments.

The drawings show, as an example, one manufacture of corner bars according to the invention, but they could evidently relate to other types of sections or even plates.

In FIGS. 1 and 2, an extruder 1 is shown intended to produce a soft matter 3 in relatively thick ribbon form.

Matter 2, which will be further described below in respect of composition, is deposited on strip sheet 3, which is unrolled from spool 4 then given translation motion, said matter 2 being carried by sheet 3 during its translation motion.

As shown more particularly in FIG. 2, sheet 3 is then folded along its longitudinal edges by system 5 to raise said edges and means 6 and 7 to fold the latter before it reaches a calendering device 8 (FIGS. 1 and 2).

After calendering, the product is formed into a corner bar, in this example by passing through two pairs of rollers 9, 9' before being cut into lengths for example by knives 10 (FIG. 1).

The section lengths 11 thus obtained are then dried in a drying unit 12 illustrated in FIG. 1 and seen in more detail in FIG. 3.

Figure 5:
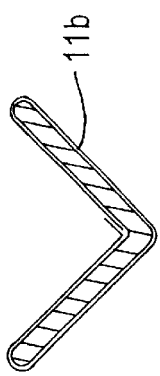
Figure 4:
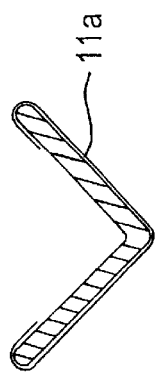

In the embodiment shown in FIG. 2, sheet 3 only partly encases matter 2 so that a section of type 11a in FIG. 4 is obtained, but it could evidently entirely encase the product as is shown by the section of type 11b in FIG. 5.

Figure 6:
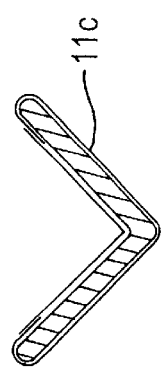

It would even be fully feasible to use two strip sheets and, for example, to have another strip 3 brought over the top of them as illustrated in the chain dotted line in FIG. 1 in order to obtain a section of type 11e in FIG. 6.

FIG. 1 also illustrates a cross section of different possible products under manufacture when the latter are still flat shape, that is to say before they are formed.

Also, for reasons which shall be explained below, sheet 3 (and possibly likewise sheet 3') is perforated, here by barbed rol 13 (FIGS. 1 and 2) in order to provide a multitude of perforations.

FIGS. 7 to 10 show four types of sheet respectively 3a to 3d, sheet 3a not being specially perforated, while sheets 3b, 3c and 3d are possible examples of perforations, the perforations of sheet 3d (FIG. 10) even representing special patterns or signs. The presence of perforations in the paper does not give rise to any technical problem when press gluing by calendering owing to the relatively low fludity of the mixture and the considered working temperatures which shall be examined below.

Soft matter 2 is obtained on exiting extruder 1 from a heated mixture containing a non-synthetic binder, of polysaccharide type for example, and advantageously containing starch or even proteins.

The starch is derived for example from low quality flour which is a particularly advantageous starch source notably for cost reason, such flour being for example contained in the mixture exiting the extruder in a dry mass proportion of between 4% and 30%.

The mixture also contains a plasticizer of fatty acid type, for example, of between C12 and C30 or is advantageously urea-based, said plasticizer being contained in the mixture in a dry mass proportion of between 5% and 15%. With this plasticizer, the matter can be processed at lower temperatures and with a lower water content as shall be seen below.

The urea has the advantage, among others, of exerting positive action on destructuration, gelling and fusion of the starch.

Finally, the mixture contains water and various loads, preferably paper loads (shredded paper, sawdust, plant products etc . . . ) in a dry mass proportion in the region of 40 to 85%, and possibly additives (borax, soda silicate, . . . )

The mixture's passage through the extruder assures mixing and homogenisation of the mixture, gelling then fusion of the binder, and finally produces the ribbon of matter.

The water content of the mixture on exiting the extruder advantageously lies between 4.5% and 15%, that is to say evidently a higher content than on entering the extruder while the temperature of the matter inside the extruder is maintained at least for a certain time within a range of 130° C. to 150° C., that is to say at a temperature that is higher than the melting point of starch and lower than the degradation temperature of urea.

If this description gives dry proportions for the raw materials and water content for the mixture, it must be understood that each material comprises its own humidity and that water is not generally added to the mixture.

The water content of urea and of the additives is in the region of zero while the water content of the flour is fairly constant (in the region of 14 to 17%) so that it is chiefly the biodegradable loads which are likely to alter the water content of the mixture.

This is the reason why, while having a water content of between 5% and 15% for the mixture, the proportions of raw materials could have been given with their own humidity, the proportion for flour being increased from 4–30% when dry to about 5–35% with the relatively constant humidity level mentioned above, and it will be understood that the percentage of flour will relate in particular to that of the loads and vice versa.

Sheet 3, and possibly sheet 3', are for the most part in paper or cardboard, but they may be in photographic paper or a paper-polyehtylene complex, or otherwise (for example a complex containing aluminium . . . ).

the advantage of heat treatment in an aqueous medium of this matter so formed is to make it naturally sticky, so that sheet or sheets 3 and 3' can be easily made to adhere to said matter during calendering and consequently with no other particular means.

On the other hand, owing to this humidity, the product must evidently undergo a drying operation and it even proved to be of advantage to conduct this drying during actual manufacture using, for example, apparatus such as 14, 15 and 16 (FIGS. 1 and 2) apparatus of infra-red ramp type (or even micro-wave or high frequency), apparatus 14 even being positioned on the manufacturing line before the ribbon of matter is even encased. Drying is important to allow the product to aquire optimum rigidity and mechanical resistance and to reach stable humidity as swiftly as possible.

It is also for the purpose of facilitating drying that sheet 3 used is permeable and/or perforated (FIGS. 8, 9, 10) and that in the embodiment shown in FIG. 2 the product is only partially encased contrary to French patent 2 528 350 initially cited.

However, the cut section lengths require additional drying which may of course stabilize during storage, but a drying unit of the type shown by 12 in FIGS. 1 and 3 may also be provided.

Drying unit 12 shown in closer detail in FIG. 3, has transporting means 17 intended to collect section lengths 11 and cause them to move in front of means blowing hot air such as means 18 and 19 shown.

It will be udnerstood that the product thus obtained is advantageously recyclable and/or easily biodegradable.

This product offers appreciable mechanical qualities owing to the use of casing, which also allows inscriptions for example to be made.

Numerous other means and variants can evidently be provided, in particular in respect of the casing of the matter or the number of ribbons of matter extruded at the same time, etc.

What is claimed is:

1. A continuous manufacturing process of articles, comprising the steps of:

preparing a mixture containing a starch-based non-synthetic binder and water;

thermally treating said mixture in an aqueous medium made available by said water to render said mixture adhesive;

extruding said thermally treated mixture as a soft matter on at least one strip sheet;

covering, at least partially, a periphery of said soft matter with said at least one strip sheet;

calendering said at least partially covered soft matter; and shaping and cutting said calendered soft matter into said articles;

wherein said method further comprises at least one drying step after said calendering.

2. The process according to claim 1, wherein the non-synthetic binder becomes sticky after gelling and fusion owing to the heat treatment in the aqueous medium.

3. The process according to claim 2, wherein the starch-based non-synthetic binder is derived from fluor which is contained in the mixture exiting the extruder in a dry mass proportion of between 4 and 30%.

4. The process according to claim 1, wherein said at least one strip sheet is substantially made up of resistant paper or cardboard.

5. The process according to claim 1, wherein said at least one strip sheet is made up of a complex.

6. The process according to claim 1, wherein the water content of the mixture on exiting the extruder lies between 4.5% and 15%.

7. The process according to claim 1, wherein the mixture comprises a plasticizer.

8. The process according to claim 7, wherein the plasticizer is contained in the mixture in a dry mass proportion of between 5% and 15%.

9. The process according to claim 7, wherein the plasticizer is fatty acid based.

10. The process according to claim 7, wherein the plasticizer is urea-based.

11. The process according to claim 2, wherein the mixture comprises a plasticizer;

the plasticizer is urea-based; and the temperature of the matter in the extruder is maintained at between the melting point of the starch and the decomposition temperature of the urea.

12. The process according to claim 11, wherein the temperature of the mixture is maintained in the extruder for at least a certain time within a range of 130° C. and 150° C.

13. The process according to claim 1, wherein the mixture also contains biodegradable loads.

14. The process according to claim 13, wherein the biodegradable loads are contained in the mixture in a dry, mass proportion of 40% to 85% and substantially contain paper.

15. The process according to claim 1, wherein said at least one drying step is performed using at least one of infra-red, micro-wave, and high frequency apparatus.

16. The process according to claim 1, wherein said at least one drying step is conducted after said shaping and cutting by exposing said shaped and cut articles to a hot air blow.

17. The process according to claim 1, wherein said at least one strip sheet is permeable in order to facilitate drying of said soft matter.

18. The process according to claim 17, further comprising perforating said at least one strip sheet in numerous places before said extruding said soft matter on said at least strip sheet thereby rendering the cover permeable to steam.

19. The process according to claim 1, wherein said at least one strip sheet extends only partly peripherally of said soft matter in order to facilitate drying of said soft matter.

20. A continuous manufacturing process of articles, comprising the steps of:

preparing a mixture containing a starch-based non-synthetic binder and water;

thermally treating said mixture in an aqueous medium made available by said water to render said mixture adhesive;

extruding said thermally treated mixture as a soft matter on at least one strip sheet;

covering, at least partially, a periphery of said soft matter with said at least one strip sheet;

calendering said at least partially covered soft matter; and shaping and cutting said calendered soft matter into said articles;

wherein said method further comprises at least one drying step after said calendering and the cover of said encased soft matter is permeable to steam thereby facilitating drying of the soft matter.

21. The process according to claim 20, wherein said at least one strip sheet is permeable.

22. The process according to claim 20, further comprising perforating said at least one strip sheet in numerous places before said extruding said soft matter on said at least strip sheet thereby rendering the cover permeable to steam.

23. The process according to claim 20, wherein said at least one strip sheet extends only partly peripherally of said soft matter.

24. The process according to claim 20, wherein the non-synthetic binder becomes sticky after gelling and fusion owing to the heat treatment in the aqueous medium.

25. The process according to claim 24, wherein the starch-based non-synthetic binder is derived from flour which is contained in the mixture exiting the extruder in a dry mass proportion of between 4 and 30%.

26. The process according to claim 20, wherein said at least one strip sheet substantially made up of resistant paper or cardboard.

27. The process according to claim 20, wherein said at least one strip sheet is made up of a complex.

28. The process according to claim 20, wherein the water content of the mixture on exiting the extruder lies between 4.5% and 15%.

29. The process according to claim 20, wherein the mixture comprises a plastcizer.

30. The process according to claim 29, wherein the plasticizer is contained in the mixture in a dry mass proportion of between 5% and 15%.

31. The process according to claim 29, wherein the plasticizer is fatty acid based.

32. The process according to claim 29, wherein the plasticizer is urea-based.

33. The process according to claim 24, wherein the mixture comprises a plasticizer;

the plasticizer is urea-based; and the temperature of the matter in the extruder is maintained at between the melting point of the starch and the decomposition temperature of the urea.

34. The process according to claim 33, wherein the temperature of the mixture is maintained in the extruder for at least a certain time within a range of 130° C. and 150° C.

35. The process according to claim 20, wherein the mixture also contains biodegradable loads.

36. The process according to claim 35, wherein the biodegradable loads are contained in the mixture in a dry, mass proportion of 40% to 85% and substantially contain paper.

37. The process according to claim 20, wherein said at least one drying step is performed using at least one of infra-red, micro-wave, and high frequency apparatus.

38. The process according to claim 20, wherein said at least one drying step is conducted after said shaping and cutting by exposing said shaped and cut articles to a hot air blow.

39. A continuous manufacturing process of starch-based articles, comprising the steps of:

preparing a mixture containing a starch-based non-synthetic binder in a dry mass proportion of from about 4 to about 30%, a plasticizer in a dry mass proportion of from about 5 to about 15%, and a biodegradable load in a dry mass proportion of from about 40% to about 85%;

thermally treating said mixture to achieve gelling and fusion of said starch-based non-synthetic binder in an aqueous medium made available by water contained in at least said starch-based non-synthetic binder;

extruding said thermally treated mixture, immediately after said gelly and fusion, as a soft matter on at least one strip sheet;

covering, at least partially, a periphery of said matter with said at least one strip sheet; and shaping said cover soft matter into said starch-based articles.

40. The method of claim 39, wherein said mixture does not contain externally added water during said preparing step.

* * * * *